(No Model.) 9 Sheets—Sheet 1.
A. RANK, Sr.
HARVESTING MACHINE.
No. 446,292. Patented Feb. 10, 1891.
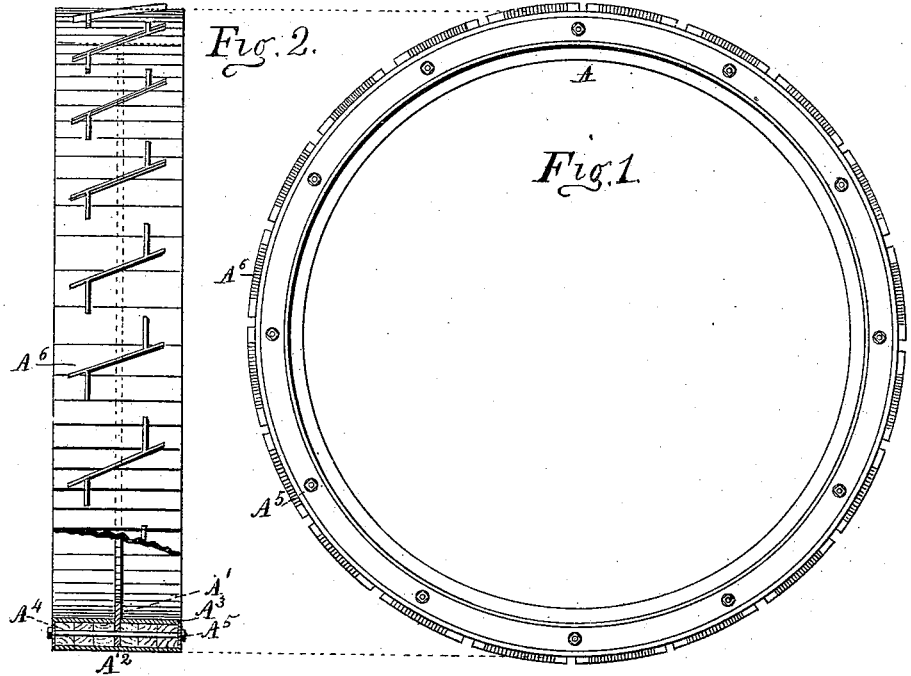
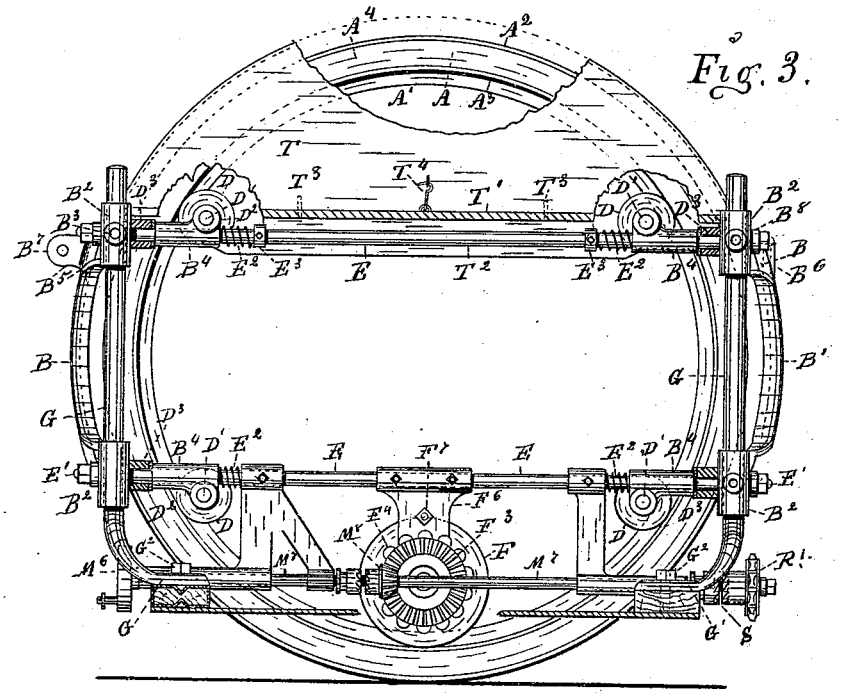
WITNESSES
J. W. Thompson
Henry L. Jones
INVENTOR
Amos Rank, Senior (No Model.)
9 Sheets—Sheet 2.
A. RANK, Sr.
HARVESTING MACHINE.
No. 446,292. Patented Feb. 10, 1891.
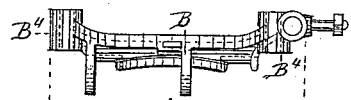
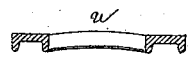
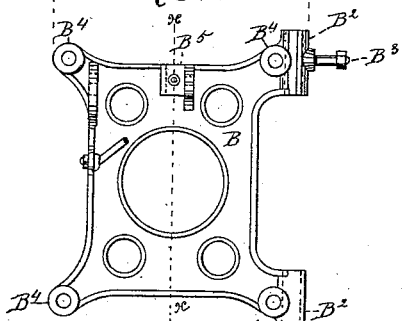
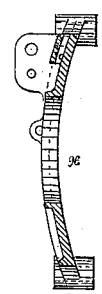
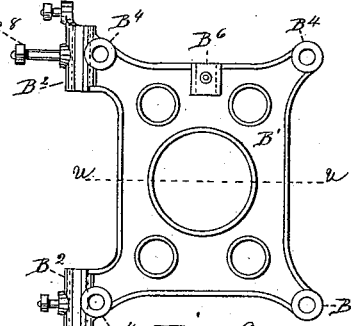
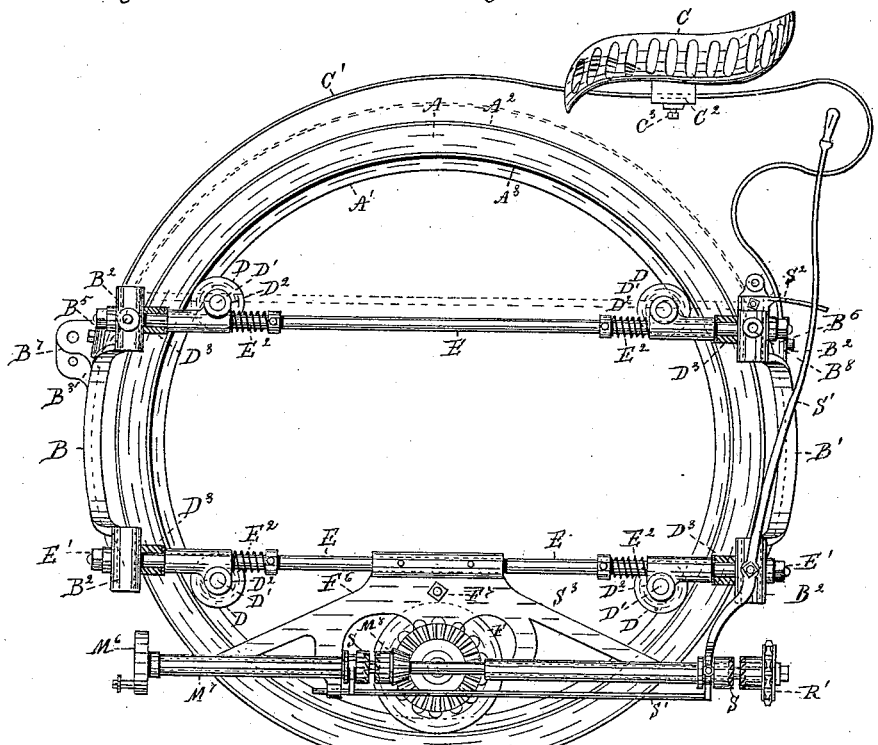
WITNESSES
J. W. Thompson
Henry C. Jones
INVENTOR
Amos Rank, Senior

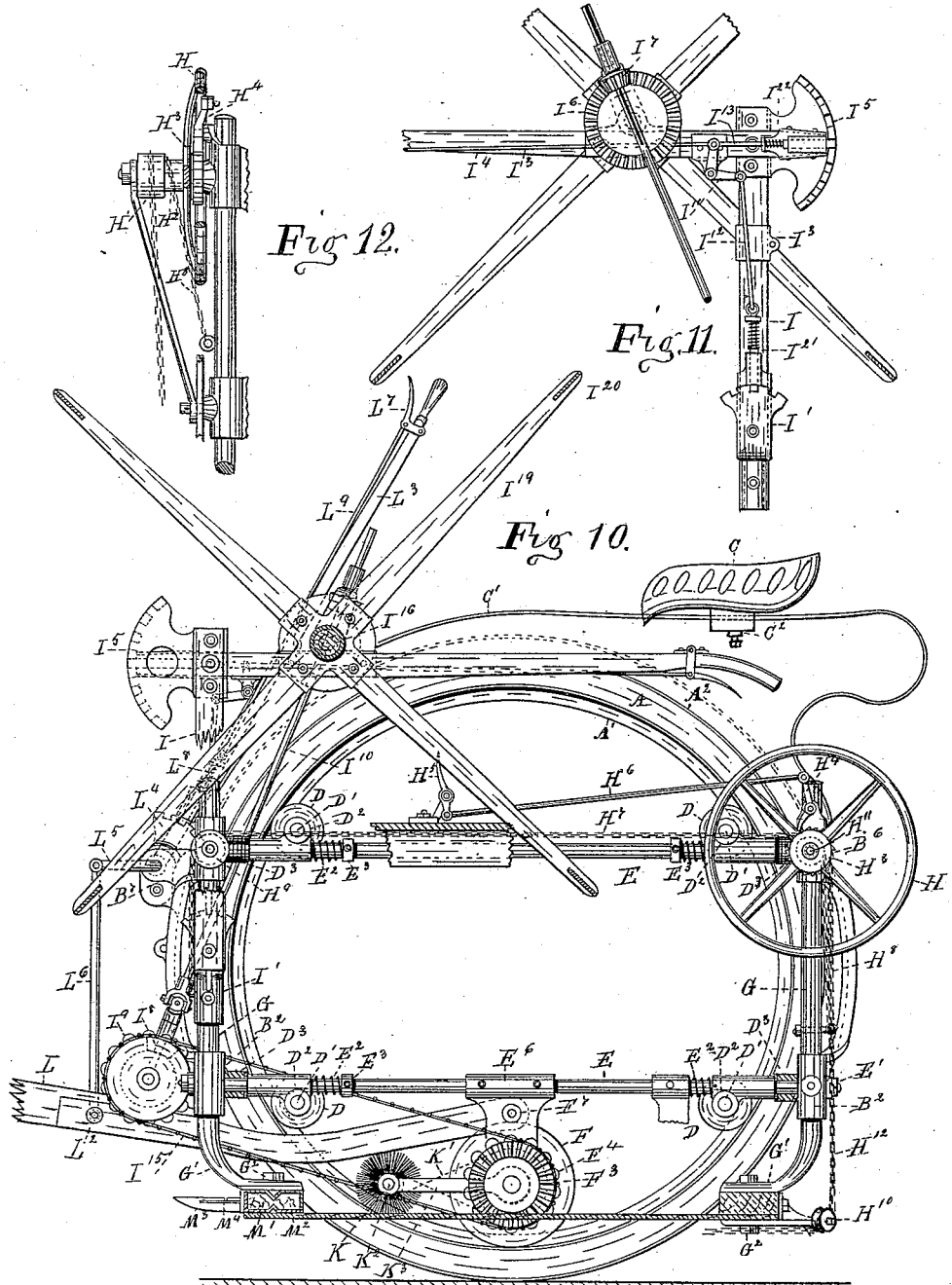

(No Model.) 9 Sheets—Sheet 4.
A. RANK, Sr.
HARVESTING MACHINE.
No. 446,292. Patented Feb. 10, 1891.
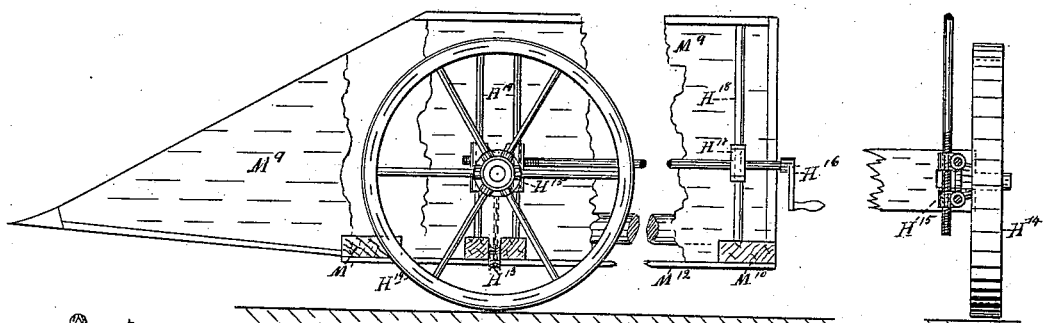
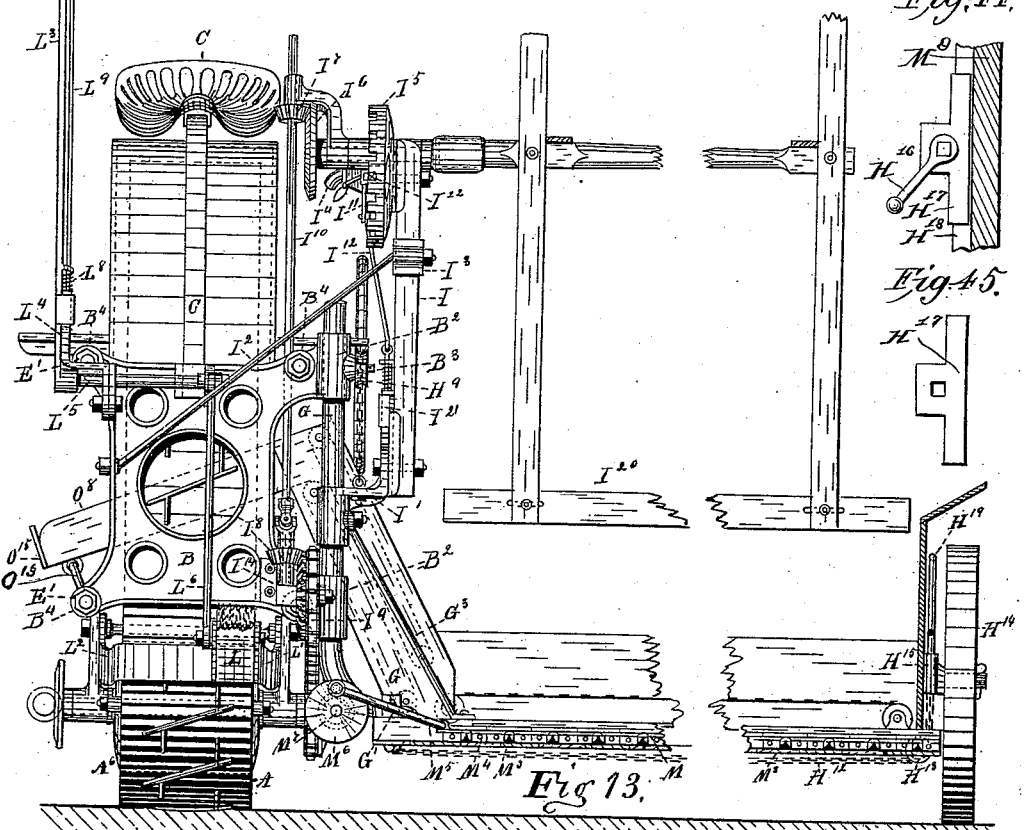
WITNESSES.
J. W. Thompson
Henry C. Jones
INVENTOR.
Amos Rank, Senior

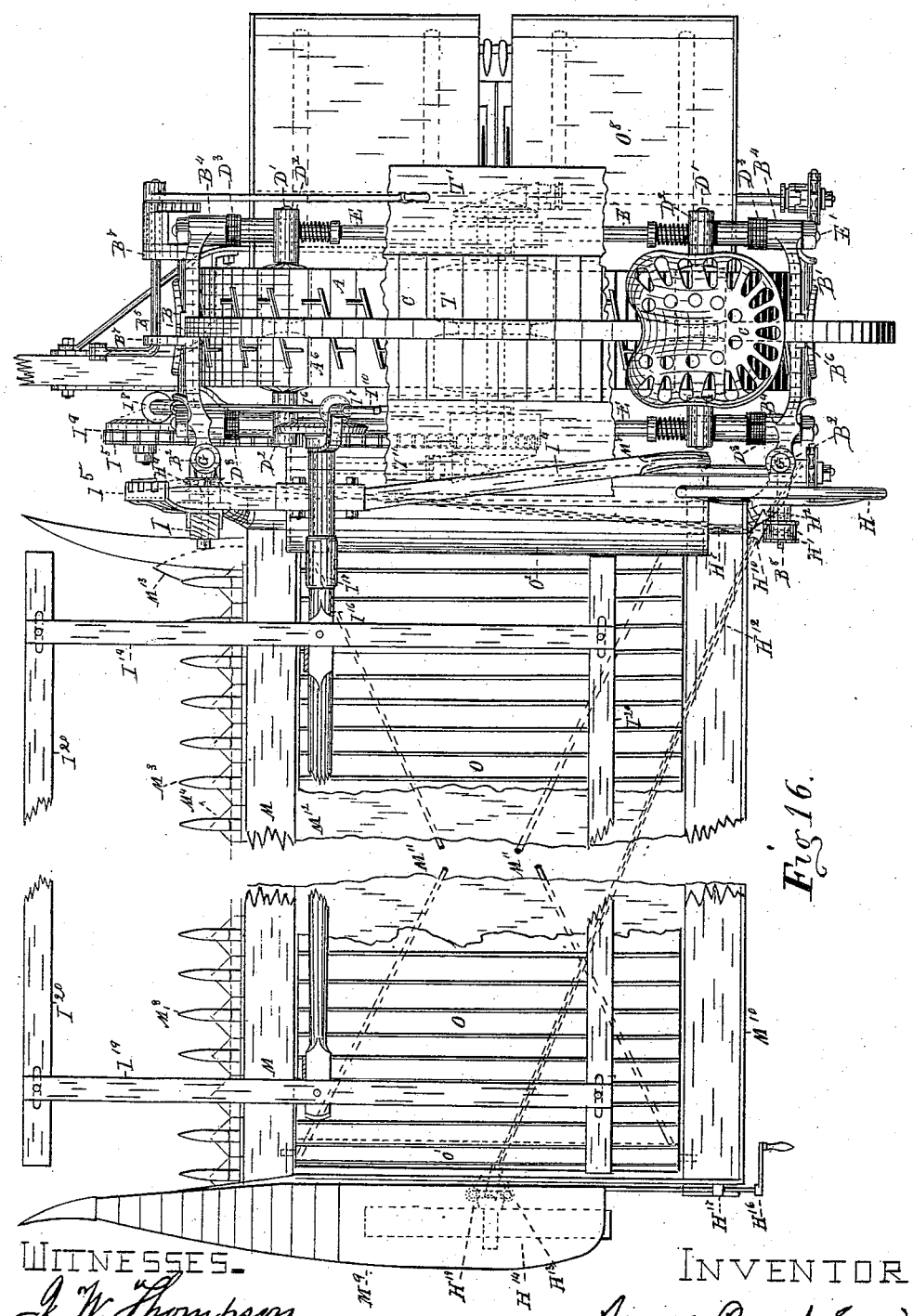

(No Model.) 9 Sheets—Sheet 6.

A. RANK, Sr.
HARVESTING MACHINE.

No. 446,292. Patented Feb. 10, 1891.

WITNESSES
J. W. Thompson
Henry C. Jones

INVENTOR
Amos Rank, Senior

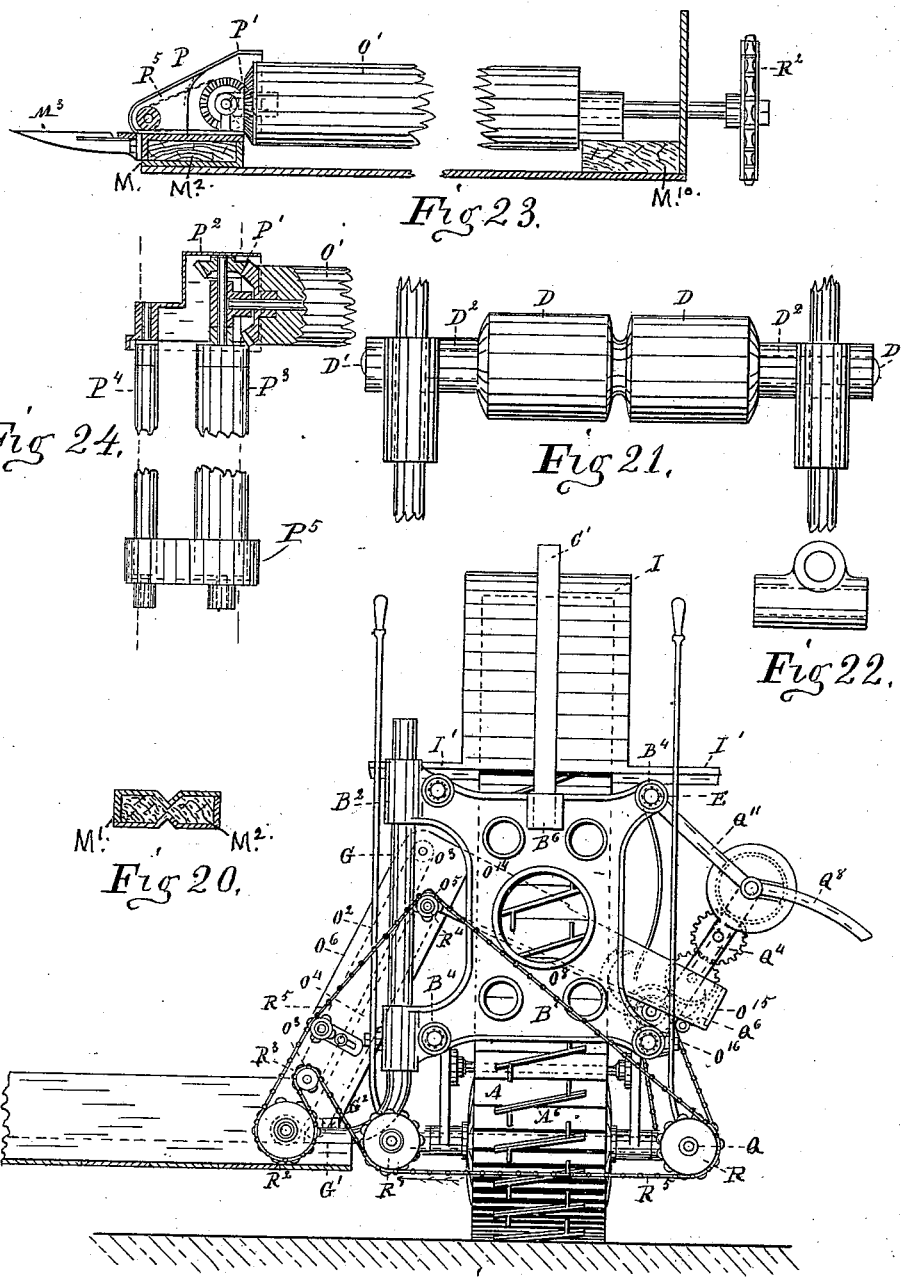

(No Model.)　　　　　　　　　　　　　　　　9 Sheets—Sheet 8.
A. RANK, Sr.
HARVESTING MACHINE.

No. 446,292.　　　　　　　　　Patented Feb. 10, 1891.

WITNESSES:　　　　　　　　　　　INVENTOR

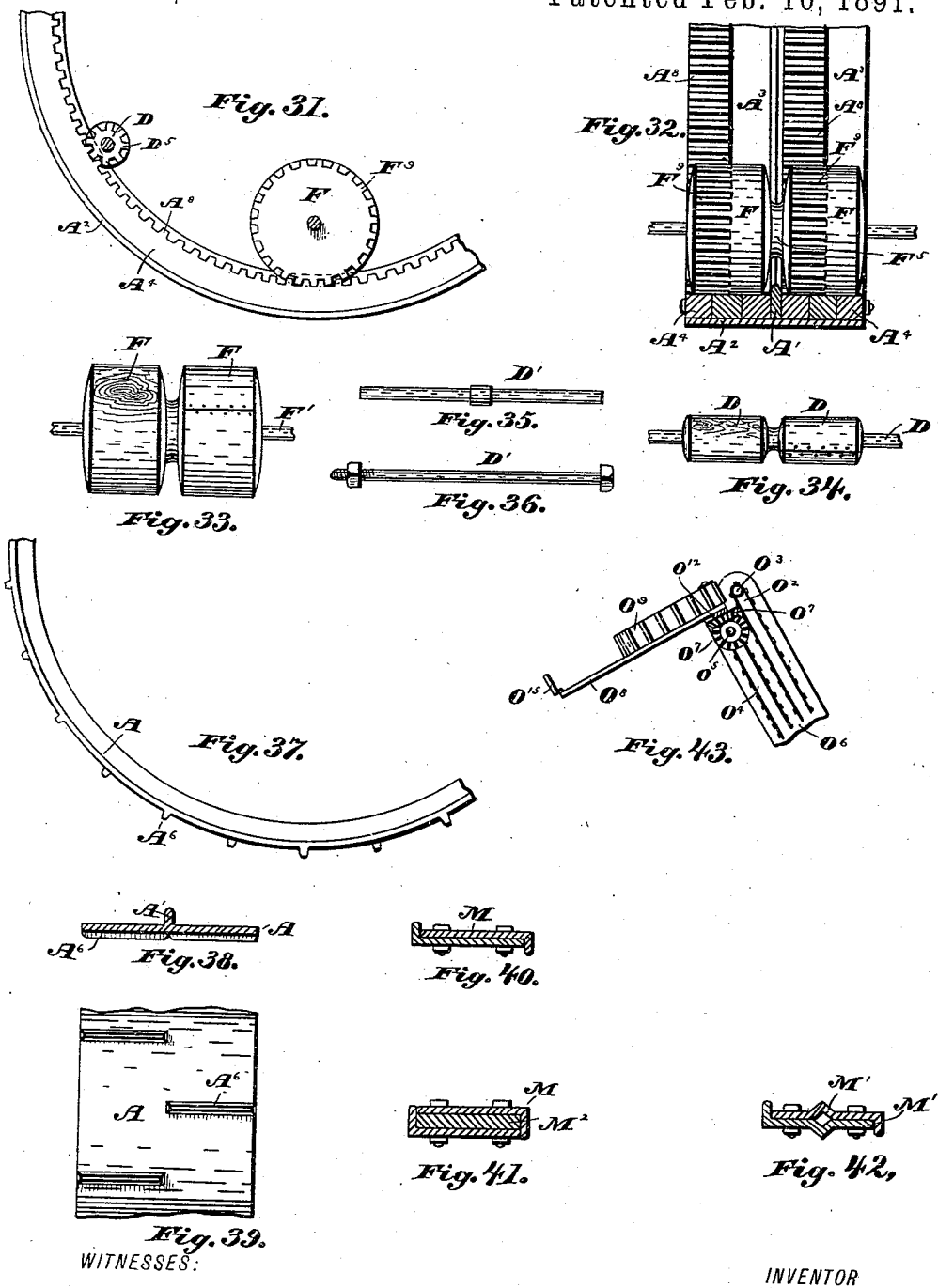

UNITED STATES PATENT OFFICE.

AMOS RANK, SR., OF SALEM, OHIO.

HARVESTING-MACHINE.

SPECIFICATION forming part of Letters Patent No. 446,292, dated February 10, 1891.

Application filed May 2, 1887. Serial No. 236,775. (No model.)

*To all whom it may concern:*

Be it known that I, AMOS RANK, Sr., a citizen of the United States, residing at Salem, in the county of Columbiana and State of Ohio, have invented a new and useful Harvesting-Machine, of which the following is a specification.

My invention relates to improvements in self-binding harvesting-machines in which an annular driving and supporting wheel of novel construction is employed, and with which a main frame, friction-rollers, and frictional driving-gearing of novel construction are combined.

My invention also relates to numerous other novel improvements and novel combinations, which are shown in the accompanying drawings, and which are more particularly set forth in the following description and claims.

The objects of my improvements are, first, to reduce the weight of the machine; second, to lessen the cost of the machine; third, to diminish the draft of the machine; fourth, to lessen the noise of the machine; fifth, to increase the safety of the machine; sixth, to perfect the balance of the machine; seventh, to simplify the management of the machine; eighth, to increase the efficiency of the machine; ninth, to extend the durability of the machine, and, tenth, to lower the center of gravity of the machine.

Figure 18:
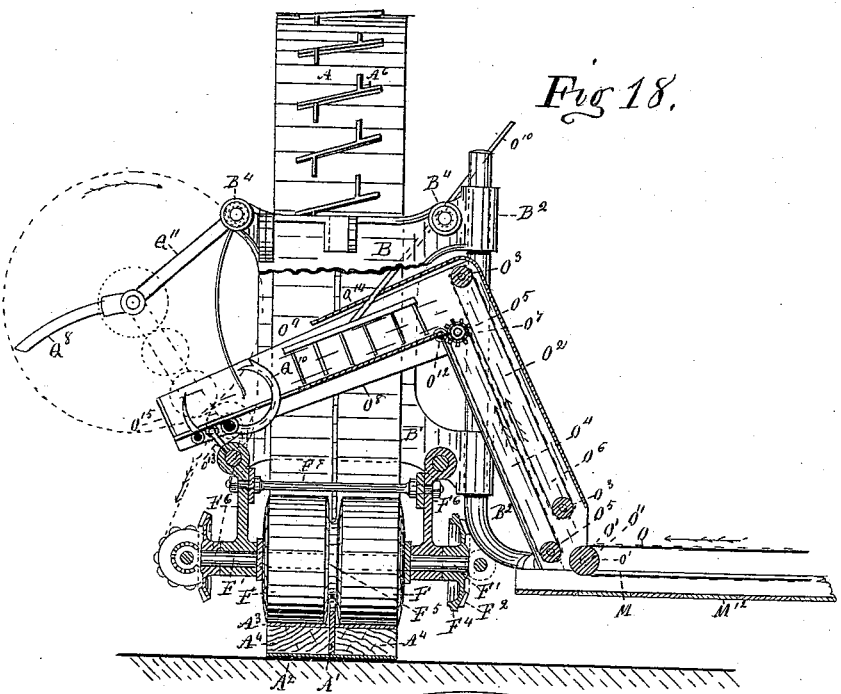
Figure 17:
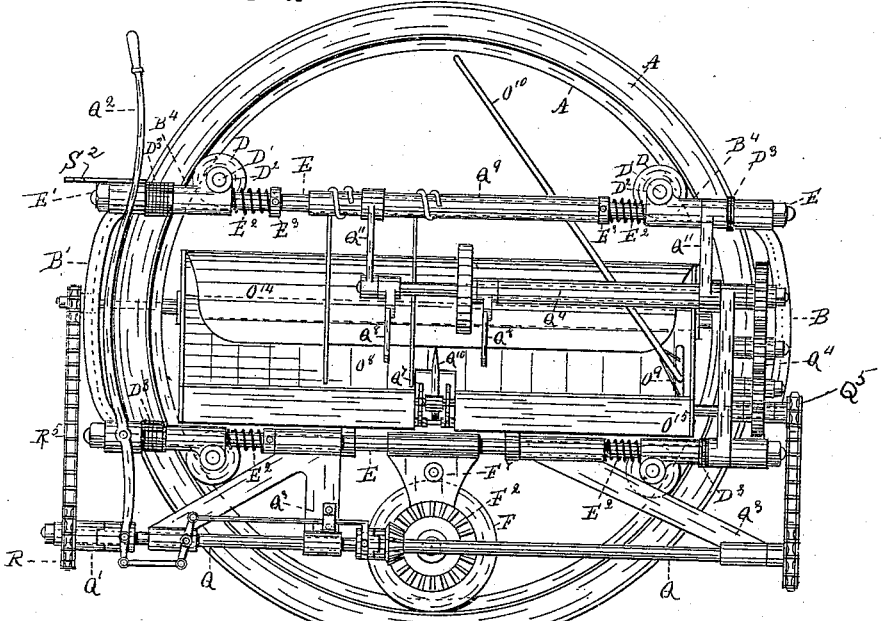
Figure 25:
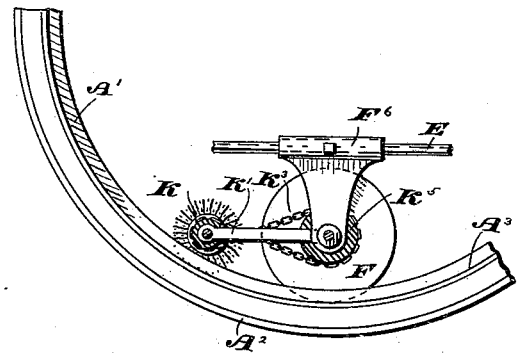
Figure 26:
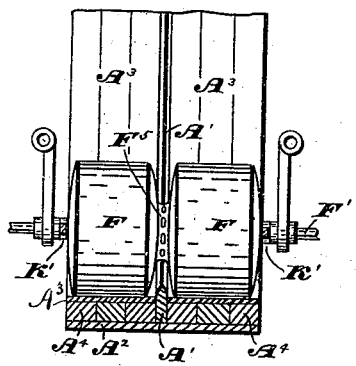
Figure 27:
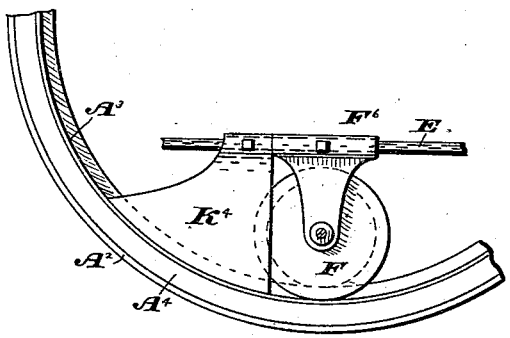
Figure 28:
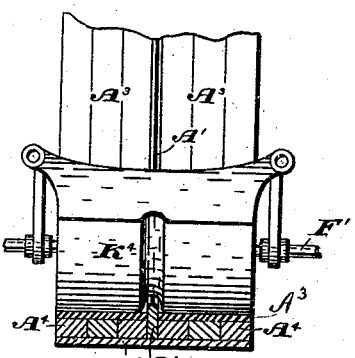
Figure 29:
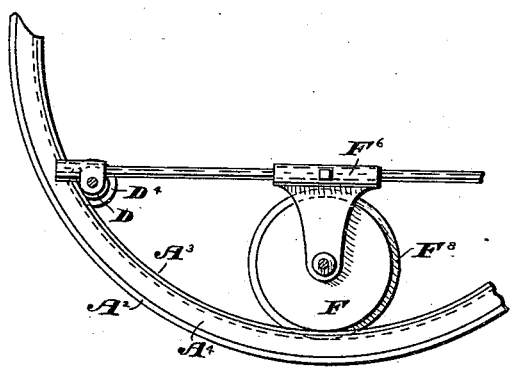
Figure 30:
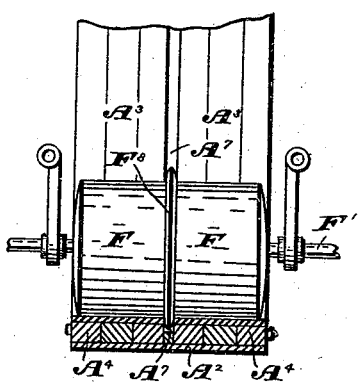

In the accompanying drawings, Figure 1 is a side view of my improved annular driving and supporting wheel, which will be hereinafter described. Fig. 2 is a front view of the same with the lower part broken away, so as to show a transverse section of the felly or rim. Fig. 3 is a side view (from the grain side) of my improved machine, certain parts being broken away and certain parts being omitted, showing details of construction and arrangements of parts which will be hereinafter described. Fig. 4 is a side view (from the grain side) of my improved machine, certain parts being omitted, showing details of construction and arrangements of parts which will be hereinafter described. Fig. 5 is a front view of the front head-piece or front end piece of the main frame. Fig. 6 is a rear view of the rear head-piece or rear end piece of the main frame. Fig. 7 is a vertical sectional view of the front end piece of the main frame at the line $x$ $x$ of Fig. 5. Fig. 8 is a plan or top view of the front end piece of the main frame. Fig. 9 is a transverse sectional view of the rear end piece of the main frame at line $u$ $u$ of Fig. 6. Fig. 10 is a side view (from the grain side) of my improved machine, certain parts being omitted, showing details of construction and arrangements of parts which will be hereinafter described. Fig. 11 is a side view of the reel, reel-post, &c., from the stubble side, showing details of construction and arrangements of parts of the reel, which will be hereinafter described. Fig. 12 is a rear view of the mechanism for raising and lowering the cutting apparatus, partly in section, certain parts being omitted which will be hereinafter described. Fig. 13 is a front view in elevation of my improved machine, certain parts being broken away and certain parts being omitted, showing details of construction and arrangements of parts which will be hereinafter described. Fig. 14 is a side view (from the grain side) of the outer end of the grain-platform, showing details of construction and arrangements of parts of the outside grain-board, grain-wheel, &c., which will be hereinafter described. Fig. 15 is a plan or top view of the grain-wheel and the mechanism for raising and lowering the platform thereon, which will be hereinafter described. Fig. 16 is a plan or top view of my improved machine, showing details of construction and arrangements of parts which will be hereinafter described. Fig. 17 is a side view in elevation (from the stubble side) of my improved machine, certain parts being omitted, showing details of construction and arrangements of parts which will be hereinafter described. Fig. 18 is a front view in elevation of my improved machine, certain parts being broken away and certain parts being omitted, showing details of construction and arrangements of parts which will be hereinafter described. Fig. 19 is a rear view in elevation of my improved machine, certain parts being omitted, showing details of construction and arrangements of parts which will be hereinafter described. Fig. 20 is a transverse sectional view of one form of my improved finger-bar. Figs. 21 and 22 are views showing the construction of the friction-rollers and the bearings for the friction-roller shafts, which will be hereinafter described. Figs. 23 and 24 are views of the finger-bar cleaner, showing details of construction and arrangements of parts which will be hereinafter described. Figs. 25 and 26 are views of parts of the driving-wheel, friction-wheel, and revolving cleaner, showing details of construction and arrangements of parts which will be hereinafter described. Figs. 27 and 28 are views of parts of the driving-wheel, friction-wheel, and plow-shaped shield, showing details of construction and arrangements of parts which will be hereinafter described. Figs. 29 and 30 are views of modified forms of the driving-wheel, friction-wheel, and friction-rollers, showing details of construction and arrangements of parts which will be hereinafter described. Figs. 31 and 32 are views of modified forms of the driving-wheel, the main friction gear-wheel, &c., showing details of construction and arrangements of parts which will be hereinafter described. Figs. 33 and 34 are views of modified forms of the friction gear-wheel, friction-rollers, &c., showing details of construction which will be hereinafter described. Figs. 35 and 36 are views of the friction-roller shafts and bolts, showing details of construction which will be hereinafter described. Figs. 37, 38, and 39 are views of modified forms of the driving-wheel rim, showing details of construction which will be hereinafter described. Figs. 40, 41, and 42 are transverse sectional views of several forms of my improved finger-bar, showing details of construction which will be hereinafter described. Fig. 43 is a view in elevation of a part of the elevator, binding-platform, butter, and the butter-gearing, showing details of construction and arrangements of parts which will be hereinafter described. Fig. 44 is a sectional view of the grain-board, locking-sleeve, and cranked rod, looking from the rear of the machine. Fig. 45 is a view of the locking-sleeve removed from the machine.

Similar letters and figures refer to similar parts throughout the several views.

Obviously a number of my improvements may be used without the others, and they may be employed in machines somewhat differently constructed without departing from the spirit of my invention.

The rim or felly of the annular main driving and supporting wheel A is constructed by bolting or riveting together side by side a series of ordinary bent wooden fellies $A^4$, each felly being in a single piece and placed in relation to each other, so as to break joints.

Between the two central fellies a flat cast or wrought iron or steel-plate ring is inserted and clamped, so that the inner edge of the same will project inwardly an inch or more and assist in stiffening and strengthening the rim of the wheel and form an inwardly-projecting flange A' for the friction-rollers D and the friction gear-wheel F to work astride of, as shown in the drawings.

After the series of fellies are bolted or riveted together and to the central flat plate-ring forming the inwardly-projecting flange an iron or a steel band $A^3$ is placed on the inside of the rim or completed felly on each side of the flange and tightly against it, which bands are fastened to the fellies with screws or bolts, forming a smooth continuous metal track for the friction gear-wheel and the friction-rollers to run on. These inside bands also further assist in stiffening and strengthening the rim or felly. An outside band or tire $A^2$, of iron or steel, is also bolted or screwed to the felly on the outside thereof, which also further assists in stiffening and strengthening the rim or completed felly, making it sufficiently strong to support and drive the machine without hub or spokes. Ordinary spuds $A^6$, made of cast or wrought iron or steel, are bolted or screwed on the outside of the annular rim or driving-wheel after the tire is put on to prevent the slipping of the wheel when in use.

Instead of the inwardly-projecting flange on the driving and supporting wheel A a groove $A^7$ might be formed in the felly, and instead of the groove in the friction gear-wheel and friction-rollers flanges might be formed on the same $F^8$ and $D^4$, as shown in Figs. 29 and 30, which would also work effectively. The annular wheel A might also be cast in one piece, or it might be made of T-shaped iron or steel in one piece, as shown in Figs. 37, 38, and 39, and also work effectively; but the wooden fellies constructed in the manner described are preferred.

The main frame consists of the two cast-metal end pieces B and B' and the four horizontal side bars E, and is constructed and arranged to surround the central opening of the annular driving and supporting wheel A, so as to provide an unobstructed space or opening through the wheel as long horizontally as the inside diameter of the wheel will permit and from one-third to one-half as high vertically in the center of the wheel, through which opening of the wheel and frame the cut grain is carried while being gaveled and bound, as will be hereafter more fully described. This is one of the characteristic features of my improved harvesting-machine and allows the use of a high driving-wheel of light construction, materially reducing the weight and draft of the the machine. It also allows the use of a very short or low elevator, materially reducing the weight, the draft, and the cost of the machine in consequence. It also allows the use of a driver's foot-platform and a driver's seat immediately over the driving-wheel and binding-platform, where the driver can readily see the working of the several parts of the machine, easily make the necessary adjustments of the reel and cutting apparatus, and feel reasonably safe in his position as compared with the like position upon other machines now in use. It also allows the location of the binding mechanism at a low-down point and lowers the center of gravity of the machine.

The cast-metal end pieces B and B' of the main frame, as shown in the drawings, have cast, cored, or drilled in them at each corner thereof horizontal sockets B⁴ one inch or more in diameter and two or more inches in length, and into these sockets are inserted the ends of the horizontal side bars E of the main frame. These bars may be made of iron or steel and may have one or both ends threaded, so as to screw into their sockets, or they may be held by tightening-nuts E', as shown in the drawings, and the frame ends drawn up tightly against a collar or shoulder on said bars. These side bars may also be made of wood, if desired; but steel or iron bars are preferred.

Before inserting the side bars E into their sockets in the end pieces of the main frame the friction sustaining-rollers D are mounted on their shafts D', the ends of said shafts are inserted in the friction-roller bearings D², and said bearings D² are slipped onto said side bars E, as shown in the drawings. The bearings D² may be held in place by means of set-screws, or suitable keys or coiled springs E² may be used in front of said bearings, as shown in the drawings, to keep the friction-rollers working up snugly against the inside bands of the driving-wheel. They will work effectively either with or without the coiled springs; but the use of the springs will prevent slack motion and noise. Leather or rubber washers D³ may also be used back of the bearings D², as shown in the drawings. The object of the washers is to be able to take up the slack motion caused by the wear of the friction-rollers D. Parts or all of said washers may be cut and removed without taking the side bars E of the main frame out of their sockets. The friction-roller shafts D' may be made of iron or steel in the form shown in Fig. 35, and the friction-rollers D may also be made of iron or steel, or they may be made of wood or rubber, or of iron and covered with leather or rubber, as shown in Fig. 34; but cast-iron is preferred. The friction-roller shafts D' may also be made as a simple bolt or rod, as shown in Fig. 36, and screwed or bolted into the bearings D² and the friction-rollers D, mounted loosely on the shafts or rods; but the first-mentioned plan is preferred. The cast-metal end pieces B and B' of the main frame have also cast on or bolted or riveted to them at their upper and lower ends, on the grain side of the machine, vertical sockets or guides B² for the vertical steel or iron posts or standards G to work up and down in. Two of these vertically-adjustable posts or standards are used in this case. They are made of iron or steel two inches or more in diameter and have feet or flat curved portions G' formed on their lower ends, by which they are rigidly bolted to the cutting-apparatus frame or grain-platform, one being bolted to the inner end of the finger-bar M and the other to the inner end of the grain-platform bar M¹⁰, the feet G' being made to stand in an oblique position on said bars, as shown in the drawings. These vertically-adjustable posts or standards G form the connection between the main frame and the cutting-apparatus frame and the means of raising and lowering the cutting apparatus and grain-platform and adjusting other parts of the machine connected therewith, as will be hereinafter more fully described. The cast metal end pieces B and B' of the main frame have also cast, cored, or fastened to them vertical sockets B⁵ and B⁶ to receive the ends of the flat spring-steel seat-support C', on which the driver's seat C is adjustably mounted, having an adjustable sliding sleeve C² and set-screw C³ to hold the seat firmly in its adjusted position on the seat-support.

The driver's seat C is made of cast-iron in the usual form; but it may also be made of wood, if desired. By being located above and somewhat back of the center of the main annular driving and supporting wheel A and by being made adjustable the driver may readily oversee the working of the machine and adjust its several parts, easily guide the team, and arrange the seat according to his weight, so as to properly balance the machine under all circumstances.

The front cast-metal end piece B of the main frame has also cast on or attached to it near the top ears or bearings B⁷ for the tilting rock-shaft L⁵ to work in, which tilting rock-shaft will be hereinafter more fully described. It has also cast on it an ear, to which the lower end of the reel-post brace I² is pivoted, which brace will also be hereinafter more fully described.

The main friction or gear wheel F is constructed in this instance in the form of two cast-iron cylinders or drums placed side by side on the same shaft F', just far enough apart to leave room for the inwardly-projecting flange A' of the main driving and supporting wheel to work in freely. In this respect the construction and operation of the friction gear-wheel and the friction-rollers are alike, as is shown in the drawings.

The main friction or gear wheel F, like the friction-rollers D, works astride of the flange A' or in a groove, as shown in the modified construction, but at all times rolls or works in the bottom of the main annular driving and supporting wheel A, so that the weight of the main frame and the parts necessarily attached to it, or which may be carried by it, are all thrown on and are borne by said main friction or gear wheel F and on the bottom of the main annular driving and supporting wheel A or on that portion of said driving-wheel rim which may at the time be at the bottom or bearing on the ground. This lessens the strain upon the annular driving-wheel and increases the power of the friction gear-wheel. The main friction or gear wheel F may also be made of wood or rubber or of wood or iron and covered with leather or rubber, as is shown in Fig. 33, or it may be a gear-wheel with suitable flanges and having gearing on part of its face only and working with corresponding gearing on the inside of the rim of the main driving-wheel A, which would become necessary; or, in other words, it may be partly a gear-wheel and partly a friction-wheel, one half of the bearing-surface be provided with cogs and the other half be smooth, and the main driving-wheel be made to correspond, as is shown in the modified construction in Figs. 31 and 32; but the friction gear-wheel first described is preferred.

The shaft F′ of the main friction or gear wheel is made of steel or iron, and in addition to the two cylinders or drums F, constituting the friction-wheel, it has also mounted upon it between the two drums a grooved chain-wheel or chain-driving sheave $F^5$ for actuating the revolving driving-wheel cleaner K, which will be hereinafter more fully described. The shaft F′ of the main friction or gear wheel F has also mounted upon it a sprocket-wheel $F^4$ on the end extending toward the grain side of the machine for the purpose of driving the gearing which runs the reel, which will be hereinafter more fully described. The shaft F′ of the main friction or gear wheel has also mounted upon it two small bevel gear-wheels, one at each end thereof, that on the grain side of the machine $F^3$ being for the purpose of running the crank-shaft and actuating the sickle and that on the stubble side of the machine $F^2$ being for the purpose of running the binding-gear shaft and actuating the carrying, elevating, gaveling, and binding mechanism, all of which will be hereinafter more fully described.

The shaft F′ of the main friction or gear wheel is mounted in adjustable hanger-bearings $F^6$, which are placed on and suspended from the two lower side bars E of the main frame. They are made of cast-iron in two parts or sections, with suitable sockets corresponding to the side bars E of the main frame, and are connected and held together by means of the long bolt $F^7$, as shown in the drawings, or by any other suitable means. The hanger-bearings $F^6$ are to be placed upon the lower side bars E of the main frame before or at the time when the side bars are inserted into the horizontal sockets $B^4$ of the end pieces of the main frame, and said bearings are made so that they may be moved slightly on the side bars, so as to increase or diminish the pressure of the friction gear-wheel on the inside bands of the driving-wheels, and are to be held in place by means of strong set-screws, as is shown in the drawings, or by any other suitable means.

The revolving driving-wheel cleaner K consists of the two cylinders of wood or iron, mounted on a shaft of iron or steel, the cylinders being provided with a series of stiff wire teeth or bristles like a brush.

Between the two cylindrical brushes on the cleaner-shaft is mounted a small chain-wheel or chain-sheave, and the shaft carrying the brushes or driving-wheel cleaner K is made to revolve in the opposite direction to that of the main friction or gear wheel by means of the crossed driving-chain $K^3$, running from the chain-wheel or chain-sheave $F^5$ on the shaft of the main friction-gear wheel F between the two drums of the same to the chain-wheel on the shaft of the cleaner K, as is shown in the drawings.

Two parallel radial arms K′, hinged at one end to the shaft of the main friction or gear wheel F and at the other end forming the bearings for the shaft of the revolving cleaner K, keep the cleaner equidistant in advance of the main friction or gear wheel. By thus running in advance of the friction-wheel and in the opposite direction to that of the friction-wheel all dirt, gravel, or other obstructing matter is thrown off or removed from the track of the friction-wheel, and the injury and breakage of the machine and its parts are prevented.

Instead of the revolving cleaner K, a plow-shaped shield $K^4$, as shown in Figs. 27 and 28, may also be used in front of the main friction or gear wheel F to remove obstructing matter; but the revolving cleaner K first described is deemed preferable.

The vertically-adjustable posts or standards G, hereinbefore described, being bolted by the feet of the same to the cutting-apparatus frame and extending up through the vertical sockets $B^2$ of the main frame, are held suspended and are raised and lowered by means of the hoisting-chains $H^7$ and $H^8$, which are attached at one end to said posts or standards G and at the other end to the hub or shaft of the hand-wheel H. The hoisting-chain $H^7$, connected with and which raises the front post or standard, runs forward along the top of the main frame and over a chain-pulley $H^9$ at the upper left-hand front corner of the main frame. The hoisting-chain $H^8$, connected with and which raises the rear post or standard, runs directly down from the hub or shaft of the hand-wheel. The hand-wheel H is mounted in this instance on a bearing pin or shaft $H^{11}$, which is suitably braced, and which is cast in or bolted to the upper left-hand rear corner of the main frame, and is provided on its inner side with a ratcheted hub, with which the gravity-pawl $H^4$ works to hold the hand-wheel from turning. The hand-wheel H is also provided with a hub or shaft on its front side of two different diameters H′ and $H^2$, one section being made larger than the other for the purpose of winding up the chain attached to that part of the hub somewhat faster than the other, so as to raise or lower the outer end of the grain-platform the same as the inner end and to adjust both ends at the same time from the driver's seat. The chain $H^{12}$ is attached at one end to the large part of the hub of the hand-wheel H and runs down in line with the rear post or standard G, and at the inner rear corner of the grain-platform runs under the chain-pulley $H^{10}$ and under the grain-platform to the outer end of the same. Then it passes around under the chain-pulley $H^{13}$, located at the bottom of the outside grain-board $M^9$, then runs up to the grain-wheel slide $H^{15}$, and is connected with the cranked rod $H^{16}$, which is screwed into said slide $H^{15}$.

From the upper end of the gravity-pawl $H^4$ a wire rod $H^6$ extends forward to the foot-treadle $H^5$, located on the driver's foot-platform T′, which platform will be hereinafter more fully described.

The grain-wheel slide is made to work up and down freely on the guide $H^{19}$, which guide consists of two bolts or rods placed parallel with each other vertically on the grain-board. The cranked rod $H^{16}$, which is screwed into the grain-wheel slide $H^{15}$ for the purpose of better coiling the chain on the rod, has on its rear end a squared section, and this crank-rod has on it a sliding locking-sleeve $H^{17}$ with a square hole in it to correspond with the squared part of the cranked rod. When it is desired to shorten the chain running from the hub of the hand-wheel H to the grain-wheel slide $H^{15}$, the sliding locking-sleeve $H^{17}$ on the cranked rod is slipped off the squared section, the rod is turned by means of the crank, which will wind up the chain, and the locking-sleeve is slipped back onto the squared section of the rod to lock it and is left to rest in the groove $H^{18}$ or seat formed in the outside grain-board for the purpose. The sliding sleeve is to be moved with the left hand, and may be moved forward or backward, so as to get it off the square section of the shaft, while with the right hand the attendant holds and turns the cranked rod as desired. The groove in the grain-board is to be made deep enough to allow the flat part or foot of the sliding sleeve to rest in it pretty snugly when the sleeve is on the squared section of the cranked rod, which rod can easily be sprung out sufficiently when sliding the sleeve on and off the squared section of the rod. This improvement is particularly useful when it becomes necessary to raise or lower the outer end of the grain-platform independently of the inner end, which is sometimes the case. When the driver wishes to raise or lower the cutting apparatus at both ends, he takes hold of the hand-wheel H with his left hand, presses his foot against the treadle $H^5$, which will release the gravity-pawl $H^4$, and by moving or turning the hand-wheel forward the cutting apparatus will be lowered and by moving or turning it backward the cutting apparatus will be raised, and by this novel and convenient arrangement of parts the inner and outer ends of the grain-platform may be easily and quickly raised or lowered at the same time from the driver's seat. As soon as the driver removes his foot from the treadle the gravity-pawl will fall into action of its own gravity and keep the hand-wheel from turning. A suitable spring may also be used in connection with the pawl, if desired.

To the front vertically-adjustable post or standard G the reel-post I is pivoted, so that when the posts or standards G and the cutting apparatus are raised or lowered the reel-post I will also be raised or lowered. The reel-post casting I′, fastened to the front vertically-adjustable post or standard G, and to which the reel-post is pivoted, is made of segmental form, with cogs or notches on its outer edge concentric to the pivot of the reel-post, and on the lower end of the reel-post is arranged a spring-catch or spring-bolt $I^{21}$ to lock the reel-post as it is moved on its pivot. At the upper end of the reel-post I, but at right angles thereto, on its front side, is fastened a similar casting $I^5$ of segmental form, with cogs or notches on its outer edge concentric to the pivot of the reel-lever $I^4$. This reel-lever is stoutly made and extends back alongside of the driver's seat or within easy reach of the same. On the front end of this lever $I^4$, just back of its pivot on the reel-post, is pivoted a small bell-crank lever $I^{11}$, and from one arm of this bell-crank lever a wire rod $I^{12}$ extends to the spring-bolt $I^{21}$ at the bottom of the reel-post I, hereinbefore described, and from the other arm a wire rod $I^{13}$ extends to the spring-bolt $I^{22}$, located on the outer end of the reel-lever $I^4$. This wire rod $I^{13}$ extends also from the vertical arm of the bell-crank lever to the hand-trigger on the rear end of the reel-lever $I^4$.

Back of the reel-post I, about one foot on the reel-lever $I^4$, is firmly bolted or riveted a barrel or pipe bearing $I^{17}$ for the reel-shaft $I^{16}$, in which the reel-shaft is made to revolve and on which reel-shaft the overhanging reel is mounted. On the inner end of the reel-shaft $I^{16}$ is fastened a small bevel gear-wheel $I^6$, and working with this bevel gear-wheel is a bevel gear-pinion $I^7$, made to slide freely on the square or feathered iron reel-driving shaft $I^{10}$ and running in a bearing arranged above the reel-shaft center. The reel-driving shaft $I^{10}$ is mounted upon the reel-post I at its lower end or upon the front part of the main frame adjacent to the lower pivot of the reel-post, so as to avoid the torsion of the shaft or the binding of the cog-gearing when the reel-post is moved on its lower pivot concentric with the upper reel-shaft, and above it is a suitable bearing for the upper reel-driving bevel-pinion $I^7$ to run in, and at the bottom of the reel-post, mounted on a suitable casting formed on or fastened to the front part of the main frame of the machine, is a sprocket bevel-wheel $I^9$, and near the lower end of the reel-driving shaft $I^{10}$ is a knuckle-joint, and on the lower end of the shaft is fastened the lower driving bevel-pinion $I^8$, working in said sprocket bevel-wheel $I^9$.

From the reel-driving sprocket-wheel $F^4$ on the inner end of the main friction or gear-wheel shaft and below the open space of the driving-wheel and main frame the sprocket-chain I[15] makes connection with and drives the sprocket bevel-wheel I[9] at the bottom of the reel-post I, so that when the machine moves forward the overhanging reel is made to revolve and bring the standing grain to the sickle, and as the grain is cut to lay it back on the platform-carrier, which conveys it to the elevator, and the elevator and its connecting mechanism carry it up over the sprocket-chain and through the main driving and supporting wheel while being gaveled and bound.

When it is desired to adjust the overhanging reels, the driver takes hold of the rear end of the reel-lever I[4], and, pulling the hand-trigger on said lever, the single wire rod extending from the hand-trigger to the bell-crank lever will actuate the bell-crank lever, and through it the two wire rods actuating the spring bolts or catches I[21] and I[22] at the top and bottom of the pivoted reel-post, and simultaneously release both catches, and the reel can then be raised or lowered or moved forward or backward at the same time by the use of a single lever, as shown and set forth. This is an advantageous arrangement of parts. One long wire rod is dispensed with, the cost and weight are slightly reduced, and the machine is made more simple and effective in practical operation.

The central wooden reel-shaft I[18] and the reel-arms I[19] and the reel-bats I[20] are made in the usual manner, as is shown in the drawings, and need not be particularly described, as no claims are made in this application upon the construction of these parts of the machine.

On the front end piece B of the main frame an ear is cast or bolted about in line with the lower pivot of the reel-post, to which the lower end of the reel-post brace I[2] is pivoted, and at the other end said reel-post brace is bolted or riveted to the sliding sleeve I[3], working on the reel-post I. When the cutting apparatus is raised or lowered and the reel-post is moved up or down with the front post or standard G, the reel-post brace I[2] will remain in the same position, allowing the reel-post I to move through the reel-post brace-sleeve I[3] and still prevent the sagging of the reel-post I, but said brace will swing on its pivot the same as the reel-post, as is shown in the drawings.

The finger-bars M and M' of my improved harvesting-machine are made by bolting or riveting together in reversed position two angle-iron or two angle-steel bars, sometimes using plain angle-bars, and when extra strength is required—as, for instance, when making a wide cutting-machine—two longitudinally-corrugated angle-iron bars bolted or riveted together in reversed position or two like bars of steel are used. Sometimes, also, strengthened bars constructed as above set forth may be used in rear of the grain-platform instead of the wooden platform-bar M[10]. Sometimes, also, a core or filling of hard tough wood M[2] may be inserted and clamped between the angle-bars, which will further assist in stiffening and strengthening the same.

From the finger-bar M in front of the grain-platform and from the rear platform-bar M[10], if necessary, stout iron or steel braces G[3] extend to the vertically-adjustable posts or standards G, which greatly assist in preserving the rigidity of the cutting apparatus frame and the relations of the same and of the main frame of the machine to the main driving and supporting wheel.

Under the frame-work of the grain-platform diagonal iron braces M[11] are arranged to extend from the four corners of the platform, which prevent the twisting or sagging of the same when in use. The ends of the braces are threaded and provided with nuts, so that they may be tightened when necessary.

The grain-platform is provided with the endless canvas platform-carrier O, which is made in the usual manner, with a wooden roller at each end, having iron or steel shafts or gudgeons and wooden cleats or slats fastened to the outside of the endless canvas belt, and being operated, as will be hereinafter more fully described, to carry the cut grain to the mouth of the elevator, which is located next to the main driving and supporting wheel A, which elevator will also be hereinafter more fully described.

On the top of the finger-bar is arranged an endless-belt finger-bar cleaner P, which consists of one long shaft or roller next to the platform-carrier O of several inches diameter and another long shaft or roller of smaller diameter next to the sickle, both being arranged parallel with the finger-bar and being provided with suitable bearings at each end. Over these shafts or rollers an endless canvas belt P[5] is made to revolve, forming an inclined carrier for moving back and depositing on the platform-carrier O the short grain and grass which sometimes hang upon the finger-bar and cause imperfect working of the sickle and the platform-carrier. This finger-bar cleaner P is operated from the bevel gear-wheel fastened on the front end of the shaft of the inner roller of the platform-carrier and meshes with and drives a corresponding bevel gear-wheel or a miter gear-wheel on the rear or larger shaft or roller of the cleaner, as is shown in the drawings.

The casting P[2], forming the bearings for the cleaner shafts or rollers at the inner end of the grain-platform, is made with a wide flange, which forms a cover for the gearing actuating the finger-bar cleaner, as is shown in the drawings.

The elevator of my improved harvesting-machine is somewhat similar to the elevators now in use on other self-binding machines, in that it consists of two endless canvas carriers O[2] and O[4], both running inwardly on shafts or rollers mounted in suitable bearings in the side pieces O⁶ of the elevator-frame and carrying the grain up between them; but as the cut grain is carried through the driving-wheel A and main frame in my improved machine while being gaveled and bound the grain need only be elevated about two feet, and the elevator is therefore much shorter or lower and lighter than those now in use in machines where the grain must be elevated four or five feet and carried up over the main driving and supporting wheel. The elevator in my improved machine is also hinged at its lower end concentric with the shaft of the inside roller of the platform-carrier O, and at its upper end has a hinged connection with the binding platform or table O⁸, which will be hereinafter more fully described. The binding platform or table is made of a width corresponding to the width of the central opening or open space in the annular driving and supporting wheel A and main frame hereinbefore described and is arranged to hang or stand at an angle with the top of the elevator leaning toward the main driving-wheel, the grain being discharged out of the upper end of the elevator onto the binding platform or table O⁸, where the open space in the driving-wheel is the widest and where the grain may easily be carried squarely through the wheel and frame while being gaveled and bound.

The binding platform or table O⁸ of my improved harvesting-machine is placed in the open spaces hereinbefore described and is hinged at its inner and upper end to the upper end of the elevator-frame concentric to the shaft of the upper roller of the lower elevator O¹², and at its lower end rests upon or is attached to short arms O¹³, which are hinged to the lower right-hand side bar E of the main frame of the machine. The binding platform or table may also be arranged to rest its lower end directly on said side bar E of the main frame and move around the shaft of the binder-gearing, which will be hereinafter more fully described.

The binding platform or table O⁸ is arranged in the open space of the driving-wheel and main frame in this instance, with the upper or inner end somewhat higher than the lower or outer end; but it may also be arranged and kept in said space in nearly a level position, if desired, the lower end being hinged and moving around the binding-gear center and the upper end moving up and down in the arc of a circle from the lower hinge. When the cutting apparatus is raised or lowered, it will thus move up or down with it.

The binding platform or table O⁸ is provided with an endless canvas butter O⁹, constructed in about the usual manner, and has connected with it a suitable hand-lever O¹⁰, extending up through the foot-platform T' near the driver's seat C for the purpose of moving or adjusting the same. The butter O⁹ is operated by means of the bevel gear-wheel O⁷, fastened on the forward end of the upper roller-shaft of the lower elevator, which drives a corresponding bevel gear-wheel on the lower end of the upper shaft or roller of the butter, as is shown in the drawings.

The gearing and other mechanism used in my improved harvesting-machine in connection with my improved binding platform or table O⁸, hinged at both ends for gaveling, binding, and discharging the cut grain, is about the same as that in use upon other machines known as "elevator-binders," and as is shown in the drawings; but in my improved machine some of the parts are arranged and combined differently, and owing to the peculiar general construction of my machine the elevating, gaveling, binding, and discharging mechanisms are made and arranged to suit the new and novel construction.

The gaveling and binding gearing and the frame-work of the same are attached to the hinged binding platform or table O⁸, partly above and partly below said platform, but so arranged around the upper binding-gear shaft that when the binding-platform is moved on its hinges the gaveling, binding, and discharging mechanisms will move with it and in all positions remain in their proper relations to each other.

The binding-gear frame Q⁴ is hinged at its lower end around the center of the lower right-hand side bar E of the main frame, and at the upper end it is connected by double-hinged arms Q¹¹ with the upper right-hand side bar E of the main frame. This makes a strong well-braced construction for the binding-gear frame, and being hinged, as shown and set forth, each part readily adapts itself to the other when the cutting apparatus is raised or lowered, and the binding-platform O⁸ is moved accordingly.

The packers Q⁷ and the automatic trip Q⁶ and the dividing and discharging devices Q⁸ and Q¹⁰ are made in any of the well-known ways and need not be particularly described, as no claims are made in this application on the construction of these parts of the machine.

The bar Q⁹, carrying the retaining-springs, is made of a section of pipe and is mounted upon the upper right-hand side bar E of the main frame, as is shown in the drawings. This bar may also be attached to said side bar of the main frame by suspending straps or hooks of suitable form, and also work effectively.

The upper binding-gear shaft, running under the hinged binding-platform O⁸, has keyed to its forward end a sprocket-wheel Q⁵, which is driven by a sprocket-chain connected with a corresponding sprocket-wheel keyed on the front end of the lower binding-gear shaft, which is mounted in hanger-bearings Q³, attached to or suspended from the lower right-hand side bar E of the main frame, and has a loose bevel-gear pinion on it in mesh with and which is driven by the bevel gear-wheel F² on the main friction-wheel shaft and drives the lower binding-gear shaft Q when thrown into gear by moving the connected clutches on said shaft into gear with the pinion and sprocket-wheel on the same shaft.

On the rear end of the lower binding-gear shaft Q is placed the loose sprocket-wheel R, which is made to drive the platform-carrier O and the elevator-carriers $O^2$ and $O^4$ by throwing the connected clutches into gear with the bevel-pinion and sprocket-wheel, as above set forth.

To the main friction or gear wheel hanger-bearings $F^6$ and on each side of the main friction-wheel F and outside of the main driving and supporting wheel A are pivoted the rear ends of the tongue-irons $L'$ and $L^2$. These tongue-irons extend forward past the rim of the main driving-wheel A and are rigidly bolted at their forward ends, one on each side, to the tongue L. This forms a pivoted tongue with its pivot in direct line with the middle of the driving-wheel A and the outside grain-wheel $H^{14}$, the pivot also being below the center of the annular driving and supporting wheel A. On this pivot the machine is easily and squarely rocked or tilted.

In the ears $B^7$ on the front end piece B of the main frame the rock-shaft $L^5$ is arranged, one arm (the one on the left-hand side) of which extends outward horizontally over the tongue L and is connected with the tongue by an iron strap or rod $L^6$. The other arm (the one on the right-hand side) extends upward and is attached to the hand-lever $L^3$, the upper end of which extends back at an angle within easy reach of the driver's seat. At the lower end of the lever a suitable rack $L^4$ is bolted to the main frame, and the lever has on its lower end a spring-bolt $L^8$, working in said rack. A hand-trigger $L^7$ on the upper end of this hand-lever and connected by a wire rod $L^9$ with the spring-bolt $L^8$ at the lower end of the lever enables the driver to release the spring-bolt by pulling the trigger and to rock or tilt the machine and raise or lower the front edge of the grain-platform, finger-bar, &c. By this means the height of cut and the pitch of the guard-fingers can readily be changed as may be desired by the driver. The driver can also materially assist in tilting or rocking the machine by throwing his own weight forward or backward in the seat C, attached to the rocking main frame of the machine.

On each side of the driver's seat C and within easy reach of the driver is arranged a long spring-steel shipper-rod, the one on the right-hand side $Q^2$ extending down in rear of the binding-platform to the connected clutches $Q'$ on the lower binding gear-shaft Q, and the one on the left-hand side $S'$ extending down in rear of the elevator-frame to the connected clutches S on the crank-shaft $M^7$. Both of these shipper rods or levers are pivoted to the lower part of the rear end piece of the main frame, and are provided at their upper end with suitable ratchets or racks $S^2$, which are fastened to the upper part of the rear end piece of the main frame, as is shown in the drawings. The clutches on said shafts are suitably connected by a single rod or by reversing-rods, or otherwise, so as to be moved into or out of gear together. The shipper-rods hold the connected clutches and their connecting-gearing in or out of action as may be desired by the driver. One of these shipper rods or levers and its connecting-gearing may be in action while the other may be out of action, so that the cutting, carrying, and elevating mechanism may be run while the gaveling and binding mechanism may be at rest.

When the clutches are provided with beveled or saw-like teeth, the long steel shipper-rods will allow the backing of the machine, the clutches acting like ratchets. When the machine is moved backward, the general machinery will be stopped, the spring-steel shipper-rods springing sufficiently to allow the clutches to slip past the catches or teeth on the same. The connected clutches may be made in any of the well-known ways and work effectively.

The sprocket-wheel $R'$ on the rear end of the crank-shaft and the sprocket-wheel R on the rear end of the lower binding gear-shaft and the bevel-pinions on both shafts are necessarily mounted loosely on their respective shafts and run loosely on the shafts when the connected clutches working with them are thrown out of gear and those on the opposite side being in gear and at work. The gearing on both sides of the main friction or gear wheel being the same size, both sides can be thrown into gear at the same time, and the strength and steadiness of the machine thus increased when in operation.

The sprocket-chain $R^5$, which drives the platform-carrier O, the two elevator-carriers $O^2$ and $O^4$, the butter, and the gaveling, binding, and discharging mechanism, is in the form of an endless belt and is arranged to run as follows: commencing at the loose sprocket-wheel R on the rear end of the lower binding gear-shaft and under it and under the sprocket-wheel $R'$ on the rear end of the crank-shaft, then up over the sprocket-wheel $R^3$ on the rear end of the lower roller-shaft of the upper elevator-carrier, then around under the sprocket-wheel $R^2$ on the rear end of the inside roller-shaft of the platform-carrier, then up over the sprocket-wheel $R^4$ on the rear end of the upper shaft of the lower elevator-carrier, and then down to the beginning place and around the sprocket-wheel first named, as is shown in the drawings.

A suitable chain-tightener is used to take up the slack, as is shown in the drawings.

The foot-platform $T'$ for the driver may be made with the boards of the same placed tightly together or somewhat openly, with spaces between the bottom boards of an inch or more in width, through which spaces the driver may observe the working of those parts of the machine immediately under the foot-platform. The bottom boards of the foot-platform are placed crosswise above and extend over the upper side bars E of the main frame several inches on each side and are nailed or screwed to wooden cleats or battens T², which battens are so placed as to rest against the inside of the upper side bars E of the main frame, and which prevents the foot-platform T' from slipping out of place. The cover or hood T over the top of the main driving and supporting wheel A is made of two side boards of semicircular shape and connected by an arching sheet-iron cover, which is then set over the top of the wheel and fastened to the foot-platform T' by suitably-constructed pins T³ and hooks T⁴. With this platform constructed as set forth, and as shown in the drawings, the position of the driver sitting in the seat C and with his feet resting on the foot-platform T', one foot placed on each side of the covered or hooded main driving and supporting wheel, will be very easy, convenient, and comparatively safe.

The overdeck O¹⁴, connected with the elevator-frame of my improved harvesting-machine, is made in about the usual form, as is shown in the drawings, and need not be particularly described.

It is designed to use with my improved harvesting-machine a binder-shifter, a tightener for the platform-carrier, a bundle counter and carrier, a hinged and folding grain-platform, &c.; but as none of these improvements form any part of this application they need not be herein described.

Having described my improvements embraced in this application, I claim—

1. In an annular driving and supporting wheel for harvesters, the combination of the series of bent wooden fellies, each felly being in a single piece and bolted or riveted together side by side, as set forth, the central stiffening and trussing flat metal plate-ring inserted and clamped between the two central fellies, forming an inwardly-projecting flange, and the inside bands of steel or iron, one being placed on each side of the flange, forming a smooth continuous metal track for the friction gear-wheel and the friction-rollers to run on, substantially as shown and described.

2. In an annular driving and supporting wheel for harvesters, the combination of the series of bent wooden fellies, each felly being in a single piece and bolted or riveted together side by side, as set forth, the central stiffening and trussing flat metal plate-ring inserted and clamped between the two central fellies, the inside steel or iron track-bands, one being placed on each side of the flange, and the outside steel or iron tire, substantially as shown and described.

3. In an annular driving and supporting wheel for harvesters, the combination of the series of bent wooden fellies, each felly being in a single piece and bolted or riveted together side by side, as set forth, the central stiffening and trussing flat metal plate-ring inserted and clamped between the two central fellies, the inside steel or iron track-bands, one being placed on each side of the flange, the outside steel or iron tire, and the metal spuds cast on or riveted to the tire, substantially as shown and described.

4. In a self-binding harvesting-machine, the combination of the annular driving and supporting wheel, the main frame constructed and arranged to surround the wheel, as set forth, so as to provide a wide clear space for the passage of the grain through said wheel and frame, and the two-part frictional sustaining-rollers mounted on shafts running in movable bearings arranged on the side bars of said main frame, substantially as shown and described.

5. In a self-binding harvesting-machine, the combination of the annular driving and supporting wheel, the main frame constructed and arranged to surround the wheel, as set forth, so as to provide a wide clear space for the passage of the grain through said wheel and frame, the two-part frictional sustaining-rollers mounted in movable bearings arranged on the side bars of said main frame, and the two-part main friction-wheel mounted on a shaft hung in adjustable bearings attached to the lower side bars of said main frame, substantially as shown and described.

6. In a harvesting-machine, the combination of the annular driving and supporting wheel, the main frame constructed and arranged to surround the wheel, as set forth, so as to provide a wide clear space for the passage of the grain through said wheel and frame, the main friction-wheel, and the revolving cleaner made to revolve in the opposite direction to that of the friction-wheel and in advance of the same, substantially as shown and described.

7. In a harvesting-machine, the combination of the annular driving and supporting wheel, the main frame constructed and arranged to surround the wheel, as set forth, so as to provide a wide clear space for the passage of the grain through said wheel and frame, the main friction-wheel, the frictional sustaining-rollers, and the revolving cleaner, substantially as shown and described.

8. In a harvesting-machine, the combination of the annular driving and supporting wheel, the main frame constructed and arranged to surround the wheel, as set forth, so as to provide a wide clear space for the passage of the grain through said wheel and frame, the main friction-wheel mounted on a shaft running in hanger-bearings attached to the lower side bars of said main frame, the frictional sustaining-rollers mounted on a shaft running in movable bearings placed on the side bars of said main frame, and the coiled springs placed on said side bars between the stops and the sliding bearings, substantially as shown and described.

9. In a harvesting-machine, the combination of the annular driving and supporting wheel, the main frame constructed and arranged to surround the wheel, as set forth, so as to provide a wide clear space for the passage of the grain through said wheel and frame, the main friction-wheel, the friction-wheel shaft, the hanger-bearings for the same attached to the lower side bars of said main frame, the revolving cleaner moving in advance of said main friction-wheel, the friction sustaining-rollers, the friction-roller shafts, the movable bearings for the same, the rubber or leather washers back of said bearings, and the coiled springs pressing against said last-named bearings to keep the friction-rollers in constant contact with the inside bands of said driving-wheel, substantially as shown and described.

10. In a harvesting-machine, the combination of the grain-wheel attached to the sliding sleeve moving up and down on the vertical guide, constructed as set forth, and the cranked rod screwed into the sliding sleeve to raise and lower the outer end of the grain-platform independently of the inner end of the same, substantially as shown and described.

11. In a harvesting-machine, the combination of the grain-wheel, the sliding sleeve, the vertical guide, the cranked rod threaded at its forward end and working in the sliding sleeve to wind up the grain-wheel chain, and the locking-sleeve on the rear end of the cranked rod to keep it from turning and to hold the grain wheel in its adjusted position, substantially as shown and described.

12. In a harvesting-machine, the combination of the hand-wheel and its ratchet, pawl, and treadle, the chains connected with the standards bolted to the inside of the grain-platform, the chain running to the outer end of the grain-platform, the grain-wheel, the grain-wheel slide, the vertical guide, the cranked rod, and the locking-sleeve on said rod, substantially as shown and described.

13. The main frame for a harvesting-machine, consisting of the two cast-metal end pieces conforming somewhat to the form of the driving-wheel at each side thereof and having horizontal sockets cast or cored in each corner of the same and the four horizontal parallel steel or iron side bars threaded at one or both ends and screwed or bolted into the sockets of said end pieces, substantially as shown and described.

14. In a harvesting-machine, the combination of the annular driving and supporting wheel, the main frame constructed and arranged as set forth, the arched steel seat-support having its ends inserted into the sockets of the cast-metal end pieces of the main frame, the adjustable seat mounted thereon, the foot-platform resting upon the upper side bars of the main frame, and the housing covering the top of the driving-wheel, substantially as shown and described.

15. In a harvesting-machine, the combination of the annular driving and supporting wheel, the main frame constructed and arranged as set forth, the hanger-bearings for the main friction-wheel, mounted on or bolted to the lower side bars of the main frame, and the tongue-irons pivoted to the hanger-bearings outside of the wheel at their rear ends and rigidly bolted to the tongue on each side thereof at their forward ends, substantially as shown and described.

16. In a harvesting-machine, the combination of the annular driving and supporting wheel, the main frame constructed and arranged as set forth, the hinged tongue pivoted to the hanger-bearings mounted on the lower side bars of the main frame, and the tilting rock-shaft mounted in ears cast on the front end piece of the main frame, one arm connected by an iron strap with the tongue and the other arm fastened to the lower end of a hand-lever and provided with a suitable ratchet and hand-trigger by means of which the main frame and cutting apparatus may be rocked or tilted, substantially as shown and described.

17. In a harvesting-machine, the combination of the annular driving and supporting wheel, the main frame, the reel-post mounted on the vertically-adjustable standard bolted at its lower end to the finger-bar, the reel-post brace with its sliding sleeve, and the brace extending from the front vertical standard to the finger-bar, substantially as shown and described.

18. In a harvesting-machine, the combination of the annular driving and supporting wheel, the main frame, the vertically-adjustable standards, the reel-post, the reel-post brace, the finger-bar, the vertical standard-brace, the hand-lever for moving the reel-post on its pivot, the hand-wheel, and the chains running from the hand-wheel to the standards to raise and lower the standards, and through them the reel-post, substantially as shown and described.

19. In a harvesting-machine, the combination of the annular driving and supporting wheel, the main frame constructed and arranged as set forth and having vertical sockets at the four corners thereof on the grain side of the machine, the adjustable vertical standards working up and down through the sockets and fastened at their lower ends to the finger-bar and adjustable grain-platform, the reel-post pivoted to the front standard, the vibrating hand-lever pivoted at its front end to the top of the reel-post, and the overhanging reel mounted on the reel-shaft running in a pipe-bearing bolted to the hand-lever back of its connection with the post, substantially as shown and described.

20. In a harvesting-machine, the combination of the reel-post pivoted at its lower end to the vertically-adjustable standard, the vibrating hand-lever pivoted to the top of the reel-post, the overhanging reel and reel-shaft mounted on the hand lever, the reel-post brace, with its sliding sleeve, working on the post, and the standard-brace, substantially as shown and described.

21. In a harvesting-machine, the combination of the reel-post pivoted at its lower end to the vertically-adjustable standard, the vibrating hand-lever pivoted to the top of the reel-post, the overhanging reel and reel-shaft mounted on the hand-lever, the reel-post brace with its sliding sleeve working on the post, the standard-brace, the bell-crank lever mounted on the hand-lever just back of the post, the notched segmental castings and spring-bolts working with the same at the top and bottom of the post, the hand-trigger, and the single wire rod running from the hand-trigger to the bell-crank lever to actuate the bell-crank lever, and through it to release both spring-bolts to adjust the reel, substantially as shown and described.

22. In a self-binding harvesting-machine, the combination of the annular driving and supporting wheel, the main frame constructed and arranged as set forth, the main friction-wheel, the friction-wheel shaft running in hanger-bearings adjustably mounted on the lower side bars of the main frame, the bevel-wheel on the inner end of said shaft, the crank-shaft and its hanger-bearings, the bevel-pinion and the clutches on said shaft connecting with the cutting mechanism and the conveying mechanism, and the long spring-steel shipper-rod connected with the clutches at its lower end and extending to the upper rear part of the main frame alongside of the driver's seat to throw the cutting apparatus in and out of gear, substantially as shown and described.

23. In a self-binding harvesting-machine, the combination of the annular driving and supporting wheel, the main frame constructed and arranged to surround the wheel, as set forth, so as to provide a wide clear space for the passage of the grain through said wheel and frame, the adjustable grain-platform, the platform-carrier, the hinged elevator, the binding-platform, and the mechanism for gaveling and binding the grain while passing through said wheel and frame, substantially as shown and described.

24. In a self-binding harvesting-machine, the combination of the annular driving and supporting wheel, the main frame constructed and arranged to surround the wheel, as set forth, so as to provide a wide clear space for the passage of the grain through said wheel and frame, the vertically-adjustable grain-platform, the platform-carrier, the hinged elevator, the hinged binding-platform, and the mechanism for raising and lowering the grain-platform and moving the elevator and binding-platform on their hinges at the same time, substantially as shown and described.

25. In a self-binding harvesting-machine, the combination of the annular driving and supporting wheel, the main frame constructed and arranged to surround the wheel, as set forth, so as to provide a wide clear space for the passage of the grain through said wheel and frame, the adjustable grain-platform, the platform-carrier, the hinged elevator, the hinged binding-platform, the overhanging reel, and the mechanism for adjusting the several parts, substantially as shown and described.

26. In a self-binding harvesting-machine, the combination of the annular driving and supporting wheel, the main frame constructed and arranged to surround the wheel, as set forth, so as to provide a wide clear space for the passage of the grain through said wheel and frame, the main friction gear-wheel, the friction-rollers, the vertically-adjustable grain-platform, the platform-carrier, the finger-bar cleaner, the hinged elevator, the binding-platform hinged to move around the gaveling and binding-gearing, the overhanging reel, the mechanism for raising and lowering the grain-platform, the mechanism for adjusting the reel, and the mechanism for rocking or tilting the machine, substantially as shown and described.

27. In a self-binding harvesting-machine, the combination of the annular driving and supporting wheel, the main frame constructed and arranged to surround the wheel, as set forth, so as to provide a wide clear space for the passage of the grain through said wheel and frame, the friction-rollers, the friction gear-wheel, the gear-wheel shaft, the bevel gear-wheel on the outer end of said shaft for driving the binding-gear, the lower binding-gear shaft, the bevel-pinion on said shaft, the sprocket-wheel on the front end of said shaft, and the sprocket-chain connecting with and driving the upper binding-gear shaft located immediately under and connected with the hinged binding-platform, said platform extending through the open space in said driving and supporting wheel, substantially as shown and described.

28. In a self-binding harvesting-machine, the combination of the annular driving and supporting wheel, the main frame constructed and arranged to surround the wheel, as set forth, so as to provide a wide clear space for the passage of the grain through said wheel and frame, the main friction gear-wheel mounted on the shaft running in movable hanger-bearings on the lower side bars of the main frame, the bevel gear-wheel on the outer end of the gear-wheel shaft, the lower binding-gear shaft, the bevel-pinion and connected clutches on said shaft, and the long spring-steel shipper-rod pivoted to the lower part of the rear end piece of the main frame and its upper end extending up in rear of the binding-platform alongside of the driver's seat to throw the gaveling and binding mechanism into and out of action, substantially as shown and described.

29. In a self-binding harvesting-machine, the combination of the annular driving and supporting wheel, the main frame constructed and arranged to surround the wheel, as set forth, so as to provide a wide clear space for the passage of the grain through said wheel and frame, the binding-platform located in the open space in said wheel and being hinged at both ends, so as to be self-adjusting when the cutting apparatus is raised or lowered, and the butter on said binding-platform operated from the upper shaft of the lower elevator, substantially as shown and described.

30. In a self-binding harvesting-machine, the combination of the annular driving and supporting wheel, the main frame constructed and arranged to surround the wheel, as set forth, so as to provide a wide clear space for the passage of the grain through said wheel and frame, the double-hinged binding-platform, the endless-belt butter, the hinged elevator, the platform-carrier, the finger-bar cleaner, the packers, the discharging-arms, the binding-gear frame, the binder-gearing, and the suspending arms or straps hinged around the upper right-hand side bar of the main frame, substantially as shown and described.

31. In a self-binding harvesting-machine, the combination of the annular driving and supporting wheel, the main frame, the vertically-adjustable grain-platform, the adjustable grain-wheel, the finger-bar cleaner, the platform-carrier, the hinged elevator, the double-hinged binding-platform, the butter, the hinged binding-gear frame, the binder-gearing, the packers, the overhanging reel, the reel-lever, the hand-wheel, the hoisting-chains, the grain-wheel crank-rod, the main friction gear-wheel, the revolving cleaner, the friction-rollers, the coiled springs working therewith, the hinged tongue, the rocking lever, the crank-shaft, the crank-shaft lever, the lower binding-gear shaft, the binding-gear lever, the sprocket-wheels and sprocket-chain for running the binder-gearing, the sprocket-wheels and sprocket-chain for running the carrier-elevator, &c., the driver's adjustable seat, the driver's foot-platform, and the housing covering the top of the main driving-wheel, substantially as shown and described.

32. In a self-binding harvesting-machine, the combination of the pipe-sleeve having the retaining-arms attached thereto mounted on the upper right-hand side bar of the main frame, the binder-gearing, and the hinged arms connecting said pipe-sleeve with the binding-gear frame, substantially as shown and described.

33. In a self-binding harvesting-machine, the combination of the long spring-steel shipper-rods, the clutches on the crank-shaft connecting with the cutting mechanism and the conveying mechanism, and the clutches on the lower binding-gear shaft connecting with the binding mechanism and the racks or ratcheted plates on the upper part of the rear end piece of the main frame, substantially as shown and described.

34. In a self-binding harvesting-machine, the combination of the endless sprocket-chain for driving the platform-carrier, the two elevator-carriers, and the gaveling, binding, and discharging mechanism, the sprocket-wheels driven by the chain, the clutches connecting with the two loose sprocket-wheels, and the long spring-steel shipper-rods arranged and operating to throw the mechanism on both sides of the machine into or out of action, substantially as shown and described.

35. In a self-binding harvesting-machine, the combination of the adjustable grain-platform, the endless platform-carrier, the hinged elevator, and the double-hinged binding-table, substantially as shown and described.

36. In a self-binding harvesting-machine, the combination of the adjustable grain-platform, the endless platform-carrier, the finger-bar cleaner, the hinged elevator, and the double-hinged binding-table, substantially as shown and described.

37. In a self-binding harvesting-machine, the combination of the annular driving and supporting wheel, the main frame constructed and arranged as set forth, the adjustable grain-platform, the endless-platform carrier, the finger-bar cleaner, the hinged elevator, and the double-hinged binding-table, substantially as shown and described.

38. In a self-binding harvesting-machine, the combination of the annular driving and supporting wheel, the main frame constructed and arranged as set forth, the adjustable grain-platform and cutting apparatus, the overhanging reel, the finger-bar cleaner, the platform-carrier, the hinged elevator, and the double-hinged binding-table, substantially as shown and described.

AMOS RANK, Senior.

Witnesses:
J. W. Thompson,
Henry C. Jones.